US010359556B2

(12) United States Patent
Meng et al.

(10) Patent No.: US 10,359,556 B2
(45) Date of Patent: Jul. 23, 2019

(54) BACKLIGHT MODULE AND DISPLAY DEVICE

(71) Applicant: BOE TECHNOLOGY GROUP CO., LTD., Beijing (CN)

(72) Inventors: Xiandong Meng, Beijing (CN); Wei Wang, Beijing (CN); Xiaochuan Chen, Beijing (CN); Jian Gao, Beijing (CN); Jifeng Tan, Beijing (CN); Xianqin Meng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/916,307

(22) Filed: Mar. 9, 2018

(65) Prior Publication Data

US 2019/0086599 A1    Mar. 21, 2019

(30) Foreign Application Priority Data

Sep. 21, 2017 (CN) .......................... 2017 1 0859778

(51) Int. Cl.
| *G02B 6/00* | (2006.01) |
| *F21V 8/00* | (2006.01) |
| *G09G 3/22* | (2006.01) |
| *H05B 33/08* | (2006.01) |

(52) U.S. Cl.
CPC ........... *G02B 6/003* (2013.01); *G02B 6/0016* (2013.01); *G09G 3/22* (2013.01); *H05B 33/0803* (2013.01)

(58) Field of Classification Search
CPC ........ G02B 6/003; G02B 6/0016; G09G 3/22; H05B 33/0803
See application file for complete search history.

(56) References Cited

U.S. PATENT DOCUMENTS

| 2012/0243063 | A1 | 9/2012 | Mukawa |
| 2015/0277117 | A1* | 10/2015 | Yamada ............. G02B 27/0101 359/567 |

FOREIGN PATENT DOCUMENTS

| CN | 1774661 A | 5/2006 |
| CN | 106405932 A | 2/2017 |
| CN | 107167920 A | 9/2017 |
| WO | 2017083160 A1 | 5/2017 |

OTHER PUBLICATIONS

First Office Action for Chinese Patent Application No. 201710859778.1 dated Mar. 18, 2019.

* cited by examiner

*Primary Examiner* — Anne M Hines
(74) *Attorney, Agent, or Firm* — Calfee, Halter & Griswold LLP

(57) ABSTRACT

A backlight module includes: a light guide plate; a light source for emitting light rays towards a first region of the light guide plate; a first grating provided at the first region and configured to adjust propagation directions of the light rays such that the adjusted light rays travel towards a second region of the light guide plate, and the propagation directions make an included angle with a normal to the light guide plate which is greater than the critical angle of total reflection of the light guide plate; and a second grating provided at the second region and configured to collimate the adjusted light rays such that the collimated light rays travel in a direction perpendicular to the light guide plate.

17 Claims, 8 Drawing Sheets

BACKLIGHT MODULE AND DISPLAY DEVICE

CROSS REFERENCE

The present application claims the priority of Chinese Patent Application No. 201710859778.1 titled by "Backlight Module and Display Device" and filed on Sep. 21, 2017, and the entire contents thereof are incorporated herein by reference as part of the present application.

TECHNICAL FIELD

The present disclosure relates to the display technical field, in particular to a backlight module and a display device.

BACKGROUND

Currently, the collimation of exiting light rays from a backlight module is mainly achieved by lenses provided in the exiting direction to the backlight module. For example, a point light source 001 is provided at the focal plane, and light rays emerging therefrom such as the light ray α (as shown in FIG. 1) arrive at the lens 002 and are collimated by the lens, and in turn exit perpendicular to the exiting surface of the backlight module.

With the current collimation, however, the lenses can have collimating function for only the light rays from the point light sources at their focal planes, but not for the light rays from other point light sources such as the light β as shown in FIG. 1, resulting in a poor collimation effect for the exiting light rays as a whole from the backlight module.

It should be noted that the information disclosed in the above BACKGROUND section is only to enhance understanding of the background of the disclosure, and thus may contain information which is not part of the prior art known to those skilled in the art.

SUMMARY

In one aspect of the disclosure there is provided a backlight module comprising:

a light guide plate;

a light source for emitting light rays towards a first region of the light guide plate;

a first grating provided at the first region and configured to adjust propagation directions of the light rays such that the adjusted light rays travel towards a second region of the light guide plate, the propagation directions make an included angle with a normal to the light guide plate, and the included angle is greater than the critical angle of total reflection of the light guide plate;

a second grating provided at the second region and configured to collimate the adjusted light rays such that the collimated light rays travel in a direction perpendicular to the light guide plate.

In an exemplary embodiment, the first grating comprises a plurality of grating sets which correspond to the light source one to one, and each of which comprises a plurality of sub-gratings arranged in matrix, wherein the sub-gratings each adjust the propagation directions of the light rays emitted from corresponding light sources, respectively, such that the adjusted light rays travel towards the second region of the light guide plate, the propagation directions make an included angle with a normal to the light guide plate, and the included angle is greater than the critical angle of total reflection of the light guide plate.

In an exemplary embodiment, the first sub-gratings of the plurality of first sub-gratings which are positioned in a same row parallel to a first sidewall of the light guide plate are configured to adjust the propagation directions of the light rays from the corresponding light source such that the propagation directions of the adjusted light rays are perpendicular to a second sidewall of the light guide plate, wherein the first sidewall is perpendicular to the second sidewall.

In an exemplary embodiment, the second grating comprises N second sub-gratings of which the nth second sub-grating has a distance from the first region greater than that of the n−1th second sub-grating from the first region, wherein $\eta_1+\eta_2+\ldots+\eta_N=1$, $\eta_n\times(1-\eta_{n-1})=\eta_{n-1}$, where $1<n\leq N$, n and N are integers, $\eta_n$ is diffraction efficiency of the nth second sub-grating.

In an exemplary embodiment, the first grating which is a transmitting grating and the light source are provided at a same side of the light guide plate.

In an exemplary embodiment, the first grating which is a reflective grating and the light source are provided at opposite sides of the light guide plate.

In an exemplary embodiment, the backlight module further comprises:

a first absorption layer provided at a side of the first grating away from the light guide plate and configured to absorb light rays exiting from the first grating.

In an exemplary embodiment, the second grating comprises a reflective grating provided at a side of the light guide plate away from the exiting direction, and/or a transmitting grating provided at a side of the light guide plate in the exiting direction.

In an exemplary embodiment, in the case where the second grating comprises a transmitting grating provided at a side of the light guide plate in the exiting direction, the backlight module further comprises:

a second absorption layer provided at a side of the light guide plate away from the exiting direction and configured to absorb light rays exiting the light guide plate.

In an exemplary embodiment, the backlight module further comprises:

a set of half transmitting and half reflective films provided between the first region and the second region and comprising M half transmitting and half reflective films, each of which makes a predetermined angle with the second sidewall of the light guide plate, wherein the m−1th half transmitting and half reflective film has a first surface configured to transmit part of the light rays coming from the first region to the second region and to reflect another part of the light rays to the mth half transmitting and half reflective film, a second surface configured to transmit part of the light rays reflected from the m−2th half transmitting and half reflective film to the mth half transmitting and half reflective film and to reflect another part of the light rays reflected from the m−2th half transmitting and half reflective film to the second region, wherein $1<m\leq M$, m and M are integers.

In an exemplary embodiment, the backlight module further comprises:

a reflective layer provided at the second sidewall of the light guide plate and configured to reflect the light rays from the light source striking the second sidewall.

In a second aspect of the disclosure there is provided a display device comprising a backlight module according to any of the aforesaid embodiments.

It should be understood that the aforesaid general description and the following detailed description are only exemplary and illustrative, and not intended to limit the disclosure.

BRIEF DESCRIPTION OF THE DRAWINGS

The accompanying drawings which are here incorporated in and constitute part of the specification show embodiments in compliance with the disclosure, and serve to explain the principle of the disclosure in conjunction with the specification.

DETAILED DESCRIPTION

Figure 1:
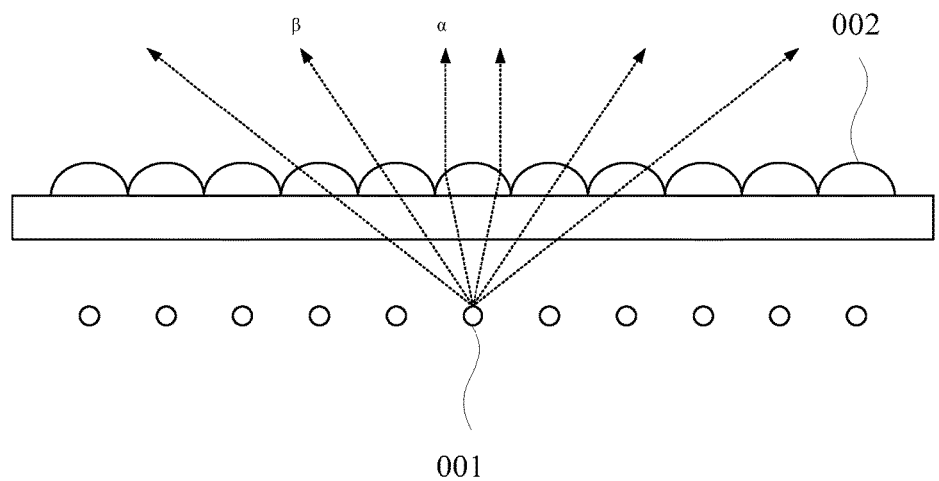
FIG. 1 is a schematic view of light collimation in the related art.

Herein more detailed description will be made to the exemplary embodiments shown in the accompanying drawings. When the following description involves the accompanying drawings, the same numeral references indicate the same or similar elements through the drawing unless otherwise stated. The implementations described in the following exemplary embodiments do not represent all of embodiments in compliance with the disclosure, but instead, are only examples of devices or methods in compliance with some aspects of the disclosure as defined in detail by the appended claims.

Figure 2:
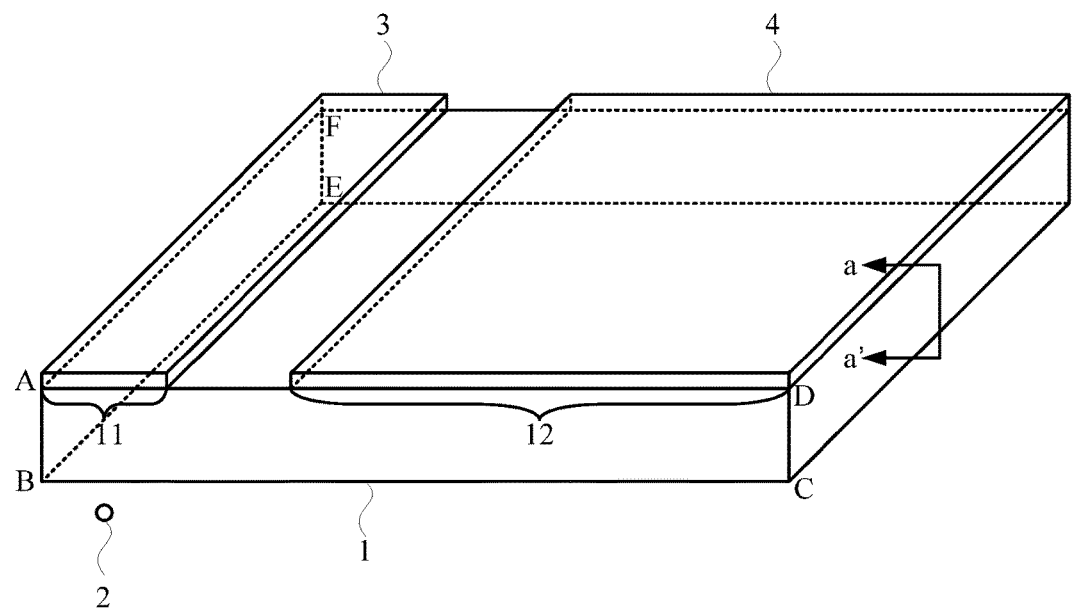
FIG. 2 is a schematic structural view of a backlight module according to an embodiment of the disclosure.
Figure 3:
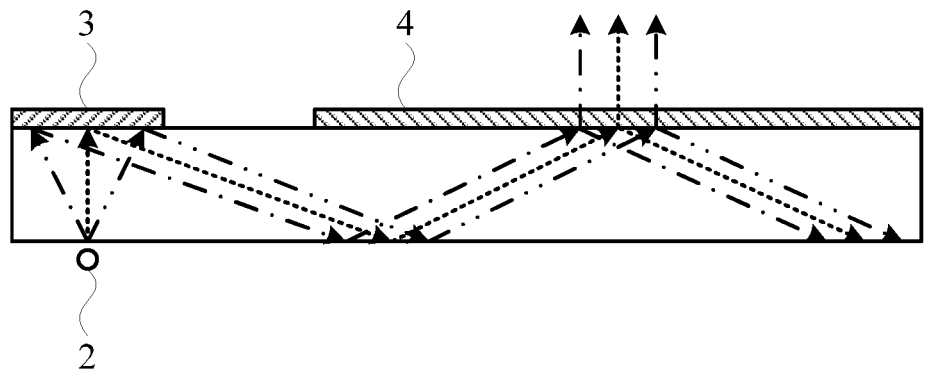
FIG. 3 is a schematic sectional view taken along aa' of the backlight module as shown in FIG. 2.
Figure 4:
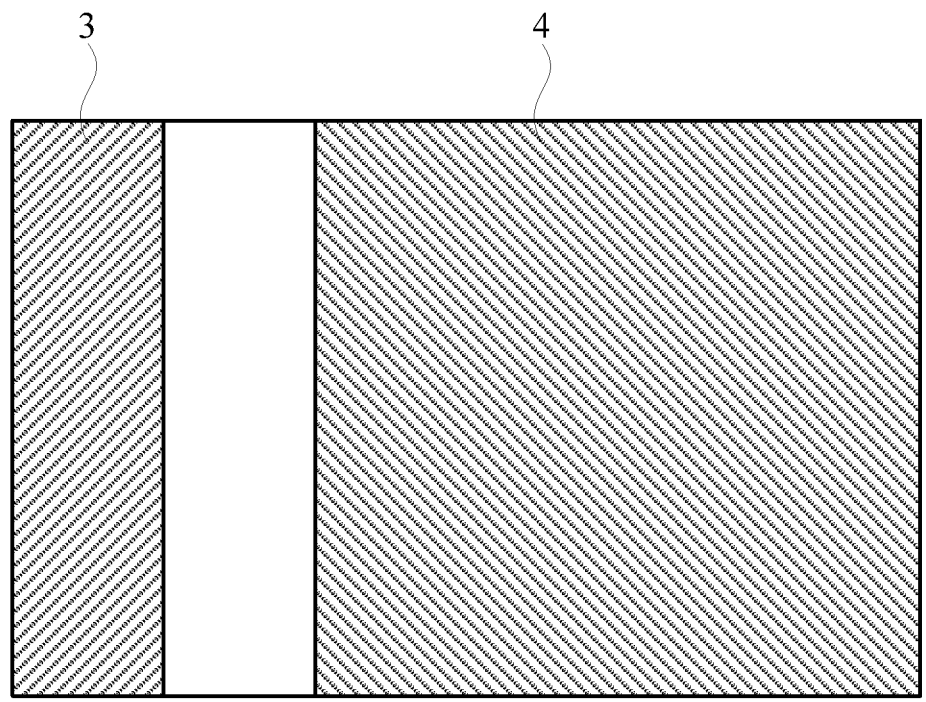
FIG. 4 is a schematic top view of the backlight module as shown in FIG. 2.

FIG. 2 is a schematic structural view of a backlight module according to an embodiment of the disclosure. FIG. 3 is a schematic sectional view taken along aa' of the backlight module as shown in FIG. 2. FIG. 4 is a schematic top view of the backlight module as shown in FIG. 2.

The backlight module according to the embodiment may be applied in display devices such as mobile phones, tablet computers, TVs, and notebook computers. As shown in FIGS. 2, 3 and 4, the backlight module comprises a light guide plate 1, a light source 2, a first grating 3 and a second grating 4.

In an embodiment, a material for the light guide plate may be glass, plastic, or other material for waveguides which can serve as light guides, such as $Si_3N_4$ or Indium Tin Oxide (ITO), which may be chosen as required.

The thickness of the light guide plate may be chosen as required, for example, may be 1 mm or thicker. The refractive index of the light guide plate may be less than that of the first grating and that of the second grating. For example, the light guide plate may have a refractive index of 1.5.

It should be noted that the shapes of the light guide plate may be chosen as required, for example, may be a hexahedron as shown in FIG. 2, or other shapes such as a column.

The light source 2 is provided to emit light rays towards a first region 11 of the light guide plate 1.

In an embodiment, the light source may be a point light source. There are a plurality of the light source. The specific number may be chosen as required. Here, the arrangement direction of the plurality of light sources may be perpendicular to a first sidewall ABCD of the light guide plate, and parallel to a second sidewall ABEF thereof.

In an embodiment, the light source may be a light emitting diode (LED) which may for example comprise an inorganic semiconductor chip, such as Micro-LED. The light source may be an organic light emitting diode (OLED). The light source emits light rays which are monochromatic light rays having a color of such as blue, or ultraviolet light rays. The light source may be transferred onto a lower surface of the light guide plate.

The first grating 3 is provided at the first region 11 and configured to adjust propagation directions of the light rays such that the adjusted light rays travel towards the second region 12 of the light guide plate, and the propagation directions make an included angle with a normal to the light guide plate 1 which is greater than the critical angle of total reflection of the light guide plate 1.

The second grating 4 is provided at the second region 12 and configured to collimate the adjusted light rays such that the collimated light rays propagate in a direction perpendicular to the light guide plate 1.

In an embodiment, the first grating may be designed as required, by which the propagation directions of the light rays entering the first region are adjusted to be desired propagation directions such that the adjusted light rays propagate towards the second region of the light guide plate and their propagation directions make an included angle with the light guide plate which is greater than the critical angle for the total internal reflection of the light guide plate, which in turn ensures that the light rays traveling in the second region can propagate in a total internal reflection way within the light guide plate. Based thereon, very most of the light rays emitted from the light source may be adjusted to enter the second region.

In an embodiment, the second grating may be designed as required, by which the aforesaid light rays propagating in a total internal reflection way within the light guide plate are diffracted such that those light rays can travel in a propagation direction perpendicular to the light guide plate and in turn exit the second grating perpendicular to the exiting surface of the light guide plate. Since the light rays exiting the second region have a same propagation direction, all of the light rays travelling in the second region may be collimated by the second grating, ensuring that there are no light rays travelling in other directions exiting from the second grating.

According to the embodiment of the disclosure, with the first grating provided at the first region of the light guide plate, the light rays from the light source entering the first region may have their propagation directions adjusted such that the adjusted light rays enter the second region of the light guide plate. Then, with the second grating provided at the second region, the light rays entering the second region are collimated, ensuring that the light rays exiting the second grating have a propagation direction perpendicular to the light guide plate and there are no light rays travelling in other directions exiting the second grating, thereby significantly improving the collimating effect on light rays.

Figure 5:
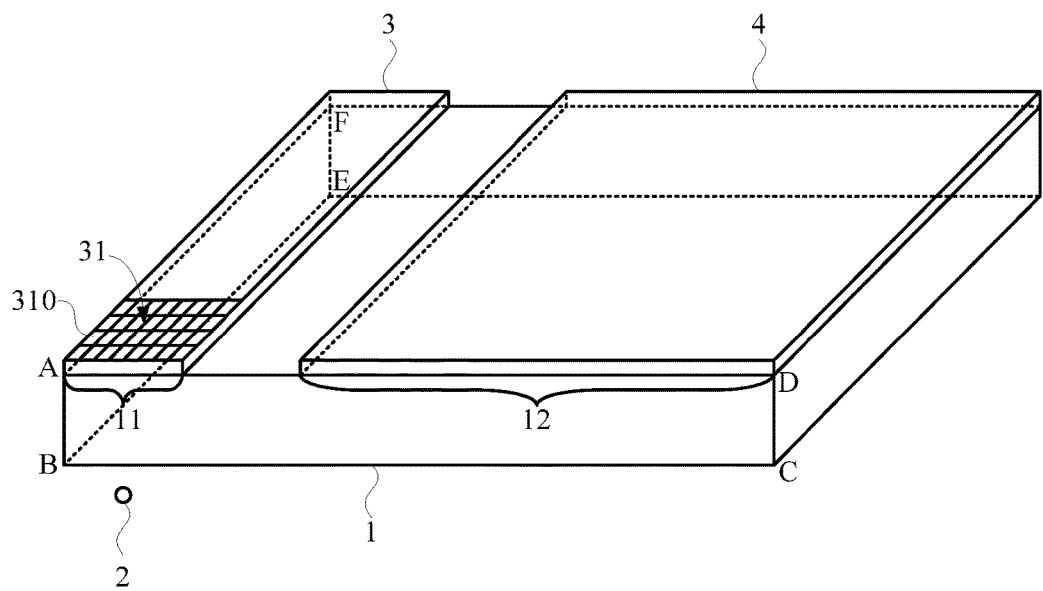
FIG. 5 is a schematic structural view of another backlight module according to an embodiment of the disclosure.
Figure 6:
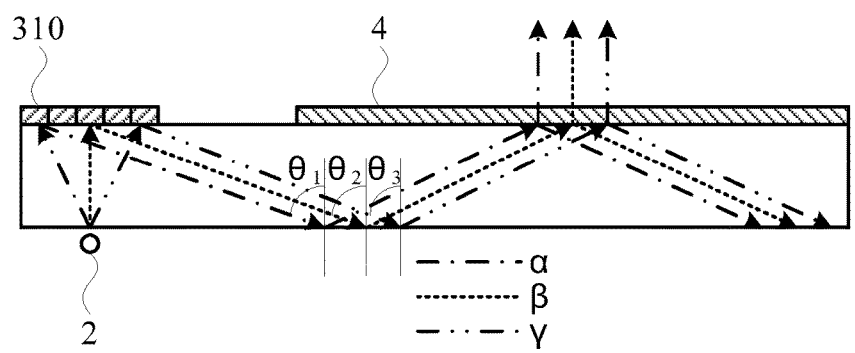
FIG. 6 is a schematic structural view of a grating set according to an embodiment of the disclosure.

FIG. 5 is a schematic structural view of another backlight module according to an embodiment of the disclosure. FIG. 6 is a schematic structural view of a grating set according to an embodiment of the disclosure.

As shown in FIGS. 5 and 6, the first grating 3 comprises a plurality of grating sets 31 which correspond to the light source 2 one to one. Each grating set 31 comprises a plurality of first sub-gratings 310 arranged in matrix.

Each of the first sub-gratings 310 adjust the propagation directions of the light rays emitted from corresponding light sources 2, respectively, such that the adjusted light rays travel towards the second region 12 of the light guide plate 1, and the propagation directions make an included angle with the normal to the light guide plate which is greater than the critical angle of total reflection of the light guide plate.

In an embodiment, the light rays emitted from the light source are not concentrated on a single point, but illuminate a plane at different positions on which incident angles of the light rays striking the first grating are different from each other. For example, as shown in FIG. 6, the light rays α, β, and γ, inter alia, have different incident angles.

Accordingly, the grating sets to which the light source corresponds, i.e., the ones struck by most of the light rays emitted from the light source, are divided into a plurality of first sub-gratings each of which is separately designed such that the first sub-grating can be adjusted in response to the propagation direction of the light rays from a corresponding light source striking it. For example, as shown in FIG. 6, the first sub-gratings 310 struck by the light ray α may adjust the propagation direction of the light ray α by diffraction such that the light ray α makes an included angle $\theta_1$ with a bottom of the light guide plate parallel to the exiting surface when striking the bottom of the light guide plate. The first sub-gratings 310 struck by the light ray β may adjust the propagation direction of the light ray β by diffraction such that the light ray β makes an included angle $\theta_2$ with the bottom of the light guide plate when striking the bottom of the light guide plate. The first sub-gratings 310 struck by the light ray γ may adjust the propagation direction of the light ray γ by diffraction such that the light ray γ makes an included angle $\theta_3$ with the bottom of the light guide plate when striking the bottom of the light guide plate. Adjustments of the respective first sub-gratings 310 may allow $\theta_1$, $\theta_2$, and $\theta_3$ to be equal.

Accordingly, it can be ensured that each of the light rays striking the first grating can be adjusted to travel towards the second region of the light guide plate, and its propagation direction makes an included angle with the normal to the light guide plate which is greater than the critical angle of total reflection of the light guide plate.

As shown in FIG. 5, the first sub-gratings 310 of the plurality of first sub-gratings 310 which are positioned in a same row parallel to a first sidewall ABCD of the light guide plate are configured to adjust the propagation directions of the light rays from the corresponding light source 2 such that the propagation directions of the adjusted light rays are perpendicular to a second sidewall ABEF of the light guide plate 1, wherein the first sidewall ABCD is perpendicular to the second sidewall ABEF.

In an embodiment, the gratings are sensitive to incident angles, and are difficult to be provided to ensure that all of the light rays entering the second region are collimated if only the included angles between the propagation directions of the light rays entering the second region and the normal to the light guide plate are assured greater than the critical angle of total reflection of the light guide plate while the angles of the propagation directions of the light rays relative to the direction perpendicular to the vertical direction, such as an angle between a plane (perpendicular to the bottom of the light guide plate) in which the light rays lie and the first or second sidewall, are not adjusted.

In an embodiment, the first sub-gratings in a same row parallel to the first sidewall are provided to adjust light rays emitted from a corresponding light source such that the adjusted light rays travel perpendicular to the second sidewall, i.e., parallel to the first wall, assuring that the adjusted light rays are parallel to each other. Accordingly, the second grating can be arranged conveniently to efficiently collimate all of the light rays entering the second region.

Figure 7:
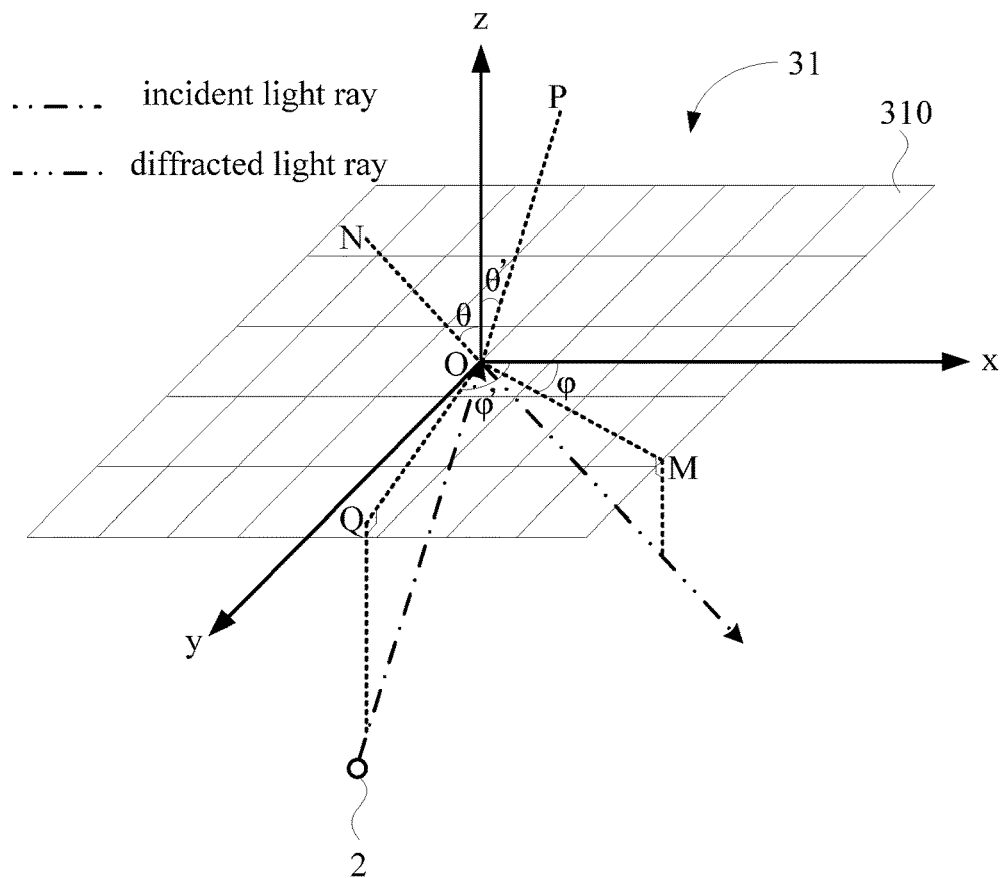
FIG. 7 is a schematic view of diffraction directions of a grating set according to an embodiment of the disclosure.

FIG. 7 is a schematic view of diffraction directions of a grating set according to an embodiment of the disclosure.

As shown in FIG. 7, a stereoscopic Cartesian coordination system is established by taking as the origin O the point where the light ray from the light source 2 strikes the grating set 31, with the x axis being perpendicular to the second sidewall, the y axis being parallel to the second sidewall, and the z axis being perpendicular to the bottom of the light guide plate.

Here, the incident light ray has a projection OQ on the plane xOy, and has an extended line OP. The x axis makes an included angle $\phi'$ with OQ, which may be called as an azimuth angle of the incident light ray. The z axis makes an included angle $\theta'$ with OP, which may be called as an incident angle of the incident light ray. Based thereon, the angles in the 3D space of the incident light ray may be represented as $(\theta', \phi')$.

The diffracted light ray formed by the incident light ray being diffracted by the first sub-gratings 310 has a projection OM on the plane xOy, and has an extended line ON. The x axis makes an included angle $\phi$ with OM, which may be called as an azimuth angle of the diffracted light ray. The z axis makes an included angle $\theta$ with ON, which may be called as an incident angle of the diffracted light ray. Based thereon, the angles in the 3D space of the diffracted light ray may be represented as $(\theta, \phi)$.

Since the adjusted light rays, i.e., the diffracted light rays, have a propagation direction perpendicular to the second sidewall of the light guide plate 1, φ may equal 0. Accordingly, from a generalized grating design yields:

$$\sin\theta = \frac{1}{n}\sqrt{n\ \sin^2\theta'\sin^2\phi' + \left[n\sin\theta'\cos\phi' + \frac{\lambda}{d}\right]^2}$$

$$\tan\phi = \frac{n\ \sin\theta'\sin\phi'}{n\sin\theta'\cos\phi' + \frac{\lambda}{d}}$$

where d is the period of the first sub-grating, λ is the wavelength of the incident light ray from the light source.

Each of the first sub-gratings are accordingly designed to assure that the diffracted light rays formed by being adjusted thereby are parallel, in particular may be parallel to or in the plane xOy, and their propagation directions make an included angle with the normal to the light guide plate which is greater than the critical angle of total reflection of the light guide plate.

For example, in the case where the included angle between the propagation direction and the normal to the light guide plate is 65°, assuming that the refractive index of grating is 2, the incident angles at which the light rays strike the first grating range from −35° to 35°, and one first sub-grating is provided every an incident angle of 5°, with the grating corresponding to 0° being spaced by 2.5° from the grating corresponding to 5°, then the number of the first sub-gratings corresponding to the plane xOy may be 16. Taking an example of the first sub-gratings at the side of 0°-35°, the structural parameters for the first sub-gratings corresponding to the every angle are shown in Table 1.

TABLE 1

| | Angle | | | | | | | |
|---|---|---|---|---|---|---|---|---|
| | 2.5 | 5 | 10 | 15 | 20 | 25 | 30 | 35 |
| Period/nanometer | 530 | 565 | 660 | 780 | 950 | 1230 | 1700 | 2450 |
| Height/nanometer | 262 | 284 | 230 | 237 | 226 | 246 | 330 | 275 |
| Duty ratio | 61% | 46% | 68% | 50% | 38% | 45% | 55% | 68% |

In addition, since the light source emits light rays towards spatial spherical surfaces, the light rays striking different first sub-gratings have different incident angles. For example, the angles in the plane xOy range from −35° to 35°, within a range of 70°. Meanwhile, not all the included angles between the propagation directions of the light rays (entering the second region of the light guide plate after being diffracted by the first sub-gratings) and the normal to the light guide plate are equal to 65°, but in the range of 57°-76°, for example as shown in FIG. 6, θ$_1$=57°, θ$_2$=65°, and θ$_3$=76°, having a range of 19°. As compared with the range of 70°, the first sub-gratings according to the embodiment also have a certain converging effect.

It should be noted that the configurations for the first sub-gratings as shown in FIG. 7 and Table 1 which indicate an embodiment of the disclosure may be adjusted as required, as long as the light rays after being adjusted by the first sub-gratings are parallel.

Figure 8:
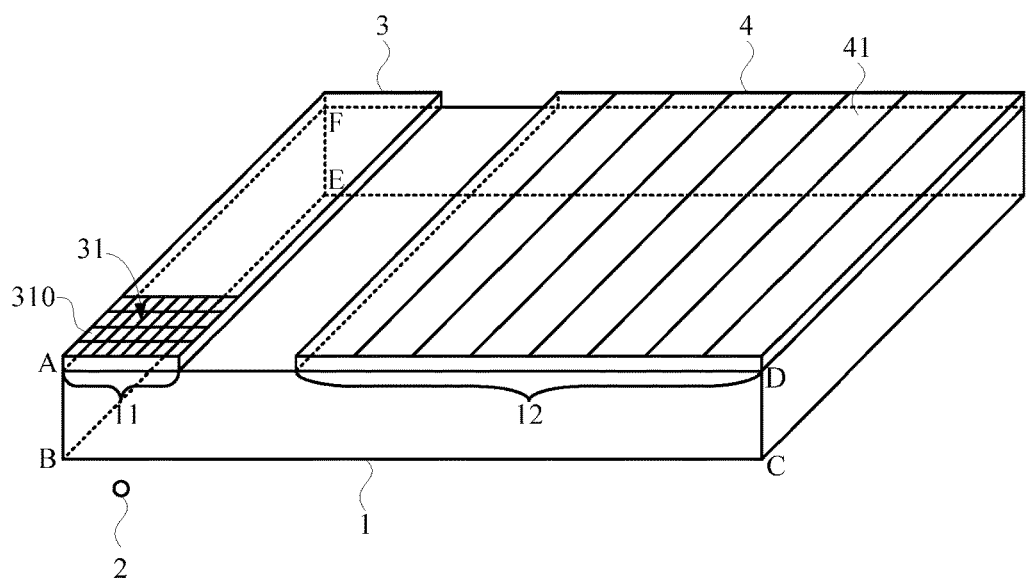
FIG. 8 is a schematic structural view of still another backlight module according to an embodiment of the disclosure.

FIG. 8 is a schematic structural view of still another backlight module according to an embodiment of the disclosure. As shown in FIG. 8, the second grating 4 comprises N second sub-gratings 41 of which the distance between the nth second sub-grating 41 and the first region 11 is greater than the distance between the n−1th second sub-grating and the first region 11, wherein η$_1$+η$_2$+ . . . +η$_N$=1, η$_n$×(1−η$_{n-1}$)=η$_{n-1}$, where 1<n≤N, n and N are integers, η$_n$ is diffraction efficiency of the nth second sub-grating.

It can be known from the embodiment as shown in FIG. 7, the first sub-gratings adjust the propagation directions of the light rays by diffraction and at the same time have a converging effect on the light rays. However, if the converged light rays, after striking the second sub-gratings, are all collimated by the second sub-gratings and travel perpendicular to the light guide plate, the consequence may be that light rays exit from only a partial region of the light guide plate.

Accordingly, the second sub-gratings may be configured to consist of N second sub-gratings, and the distance of the nth second sub-grating from the first region is greater than that of the n−1th second sub-grating 41 from the first region 11, that is to say, the second sub-gratings are aligned perpendicular to the second sidewall. Here, the diffracted light rays from each of the second sub-gratings have a diffraction angle of −1st or +1st order which equals 0, which may assure that the light rays striking the second sub-gratings may be collimated after being diffracted by the second sub-gratings, and thus travel in a direction perpendicular to the light guide plate.

Furthermore, provision of η$_1$+η$_2$+ . . . +η$_N$=1 and η$_n$×(1−η$_{n-1}$)=η$_{n-1}$ allows the second sub-gratings to have a lower diffraction efficiency as being closer to the first region and a higher diffraction efficiency as farther to the first region. At the same time, the second sub-gratings which are closer to the first region have more incident light rays and the second sub-gratings which are farther to the first region have less incident light rays. Therefore, it can be assured that the amount of the light rays diffracted from the second sub-gratings closer to the first region is substantially the same as that of the light rays diffracted from the second sub-gratings farther to the first region, and in turn the evenness of the light rays exiting the light guide plate can be assured.

Take the 1$^{st}$ second sub-grating as an example. For an instance, its diffraction efficient can be obtained by calculation as η$_1$=1.1%, and its loss rate is 1.2%, then its structural parameters are shown in Table 2.

TABLE 2

| Period/nanometer | 390 |
|---|---|
| Height/nanometer | 50 |
| Duty ratio | 52% |

Figure 9:
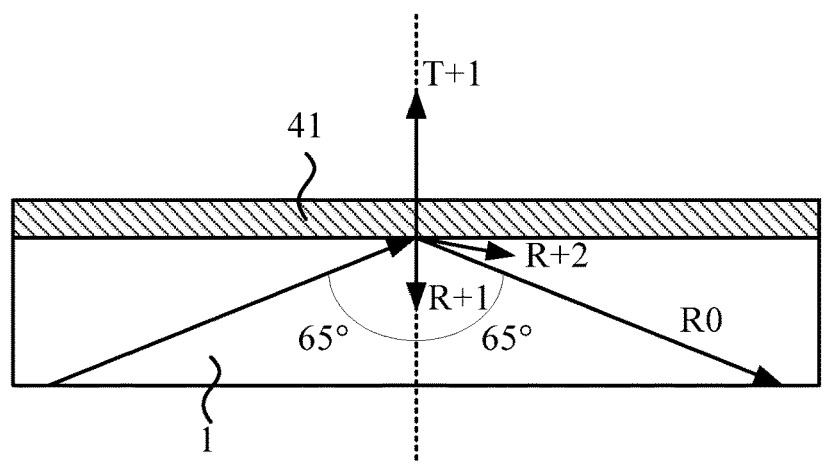
FIG. 9 is a schematic view of diffraction of the 1st second sub-grating according to an embodiment of the disclosure.

FIG. 9 is a schematic view of diffraction of the 1th second sub-grating according to an embodiment of the disclosure. As shown in FIG. 9, the incident angle of the light ray is 65°. FIG. 9 shows the propagation directions of the +2st order reflected light ray R+2, the 0th order reflected ray R0, the +1st order reflected light ray R+1, and the +1st order transmitted light ray T+1 after the light ray is diffracted by the 1th second sub-grating 41. With the 1th second sub-grating configured according to the parameters as shown in Table 2, the relationship shown in Table 3 among the light rays shown in FIG. 9 can be assured.

TABLE 3

| Diffraction order | Angle | Efficiency |
|---|---|---|
| Incident light | 65° | 100% |
| T + 1 | 0.2° | 1.1% |

TABLE 3-continued

| Diffraction order | Angle | Efficiency |
|---|---|---|
| R0 | 65° | 97.6° |
| R + 1 | −0.17° | 1.2% |
| R + 2 | 65.9° | 0.01 |

Based thereon, it can assured that the 1th second sub-grating has a diffraction efficiency (i.e., the percentage of the +1st order transmitted light rays emerging perpendicular to the exiting surface of the light guide plate after being diffracted) which is $\eta_1=1.1\%$, and a light ray loss rate (i.e., the +1st order reflected light rays amount to be lost since their reflection angles are nearly perpendicular to the exiting surface of the light guide plate and cannot be totally internally reflected within the light guide plate) which is 1.2%, and that the most of the remained energy is entrained by the 0st order reflected light rays which have a reflection angle of 65°, meet the condition of the total internal reflection, can continue total internal reflection within the light guide plate, and then arrive at subsequent second sub-gratings.

Figure 10:
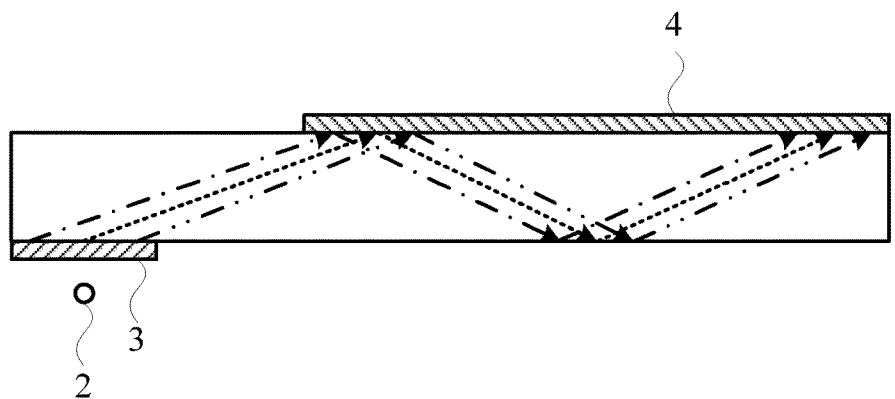
FIG. 10 is a schematic sectional view of another backlight module according to an embodiment of the disclosure.

FIG. 10 is a schematic sectional view of another backlight module according to an embodiment of the disclosure. As shown in FIG. 10, the first grating 3 which is a transmitting grating and the light source 2 are provided at a same side of the light guide plate 1.

As shown in FIGS. 2 and 3, the first grating which is a reflective grating and the light source 2 are provided at opposite sides of the light guide plate 1.

Figure 11:
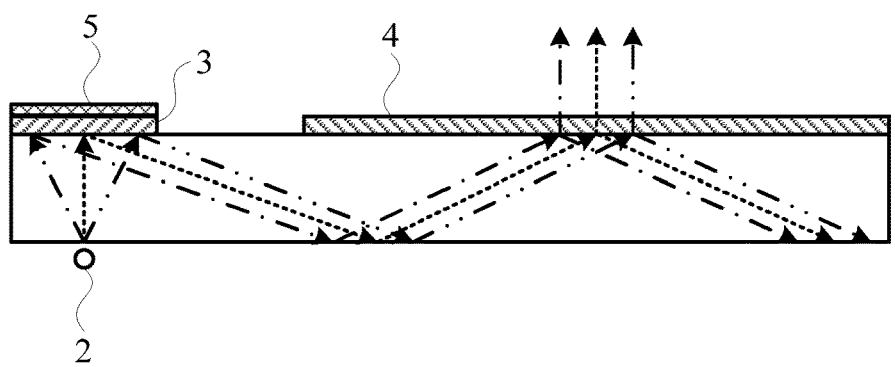
FIG. 11 is a schematic sectional view of still another backlight module according to an embodiment of the disclosure.

FIG. 11 is a schematic sectional view of still another backlight module according to an embodiment of the disclosure. The backlight module further comprises:

a first absorption layer 5 provided at a side of the first grating 3 away from the light guide plate 1 and configured to absorb light rays exiting from the first grating 3.

In an embodiment, since not all the incident angles of the light rays incident on the first grating are equal, although the first sub-gratings of the first grating can perform a good adjustment for the light rays emitted from a corresponding light source, the light rays from other light sources may pass through the grating by diffraction and have not yet been collimated by the second grating. Accordingly, the first absorption layer is provided to absorb the light rays passing through the first grating by the diffraction of the first grating, to assure the collimation effect of the backlight module as a whole, and to avoid leakage of light.

In an exemplary embodiment, the second grating comprises a reflective grating provided at a side of the light guide plate away from the exiting direction, and/or a transmitting grating provided at a side of the light guide plate in the exiting direction.

As shown in FIGS. 2 and 3, the second grating 4 may only comprise a reflective grating provided at a side of the light guide plate 1 in the exiting direction.

Figure 12:
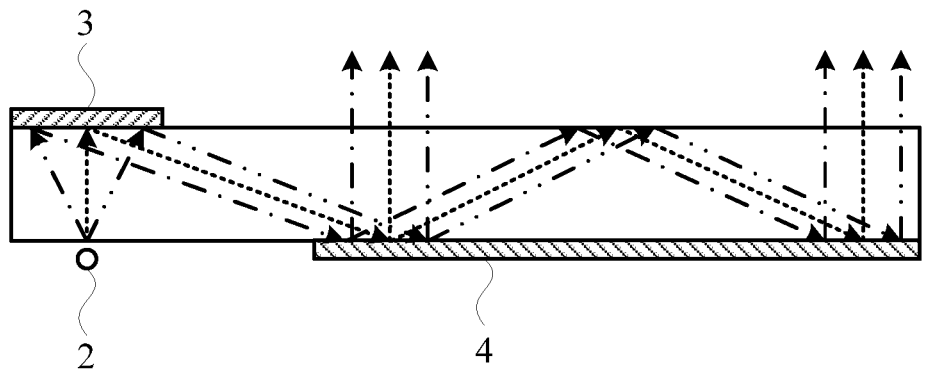
FIG. 12 is a schematic sectional view of still another backlight module according to an embodiment of the disclosure.

FIG. 12 is a schematic sectional view of still another backlight module according to an embodiment of the disclosure.

As shown in FIG. 12, the second grating 4 may only comprise a transmitting grating provided at a side of the light guide plate 1 away from the exiting direction.

Figure 13:
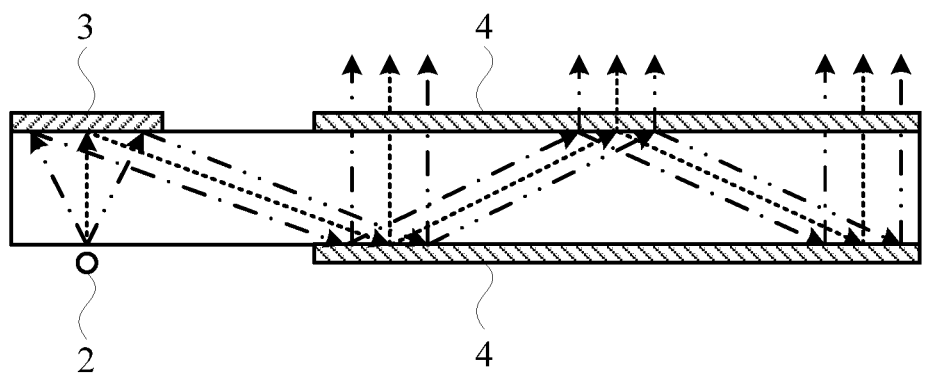
FIG. 13 is a schematic sectional view of still another backlight module according to an embodiment of the disclosure.

FIG. 13 is a schematic sectional view of still another backlight module according to an embodiment of the disclosure.

As shown in FIG. 13, the second grating 4 comprises a reflective grating provided at a side of the light guide plate 1 in the exiting direction, and a transmitting grating provided at a side of the light guide plate 1 away from the exiting direction.

The embodiments as shown in FIGS. 3, 12 and 13 may be chosen as required, any of which may be combined with the embodiments as shown in FIGS. 3 and 10 on how to configure the first grating.

Figure 14:
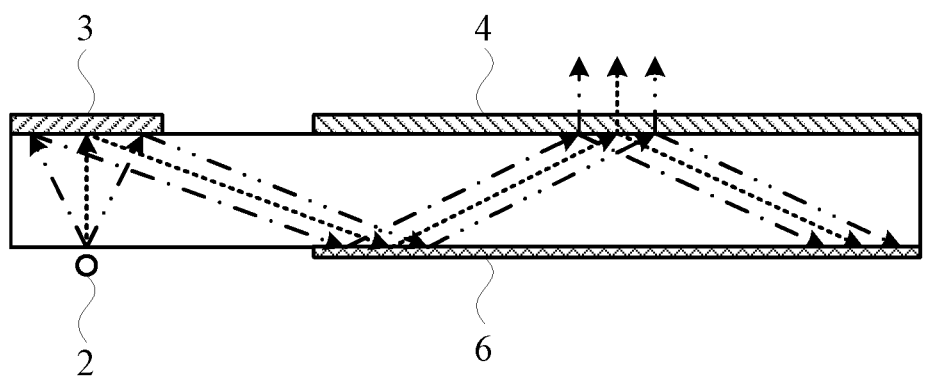
FIG. 14 is a schematic sectional view of still another backlight module according to an embodiment of the disclosure.

FIG. 14 is a schematic sectional view of still another backlight module according to an embodiment of the disclosure. In the case where the second grating comprises a transmitting grating provided at a side of the light guide plate in the exiting direction, the backlight module further comprises:

a second absorption layer 6 provided at a side of the light guide plate away from the exiting direction and configured to absorb light rays exiting the light guide plate.

Since the light rays entering the second region do not have a uniform incident angle, there are some light rays which have incident angles not greater than the critical angle and cannot travel in a total reflection way within the light guide plate, and which would exit the light guide plate when striking a side of the light guide plate not provided with the second grating, or travel towards the second grating after being reflected. The second grating, however, is provided only to collimate the light rays of fixed angles, and thus does not have a good collimation effect on the reflected light rays, resulting in that part of light rays exit the second grating without being collimated. Accordingly, the second absorption layer may be provided to absorb the light rays exiting the light guide plate in order to prevent the bottom of light guide plate from leaking light and the not collimated light rays from exiting the second grating.

Figure 15:
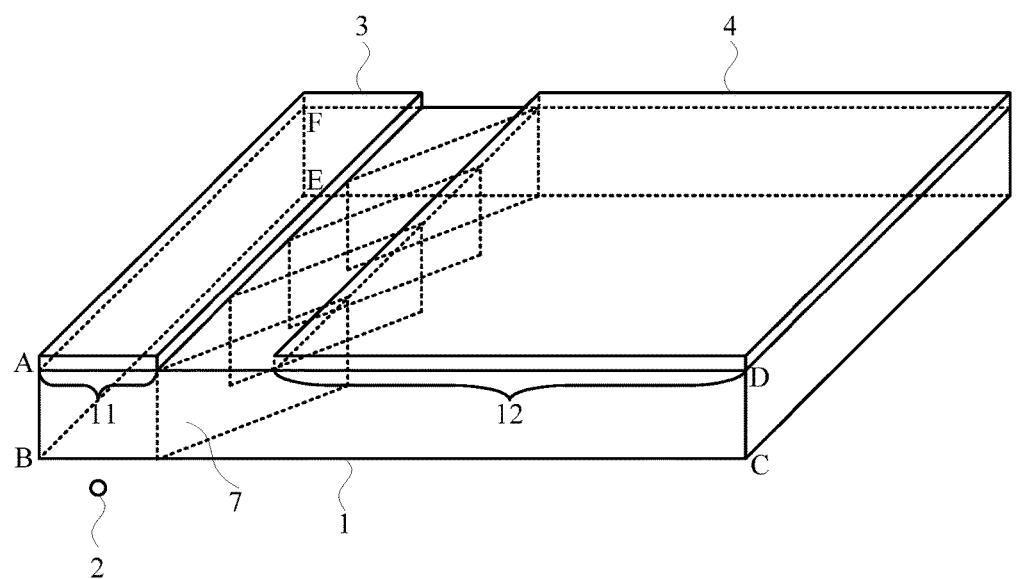
FIG. 15 is a schematic sectional view of still another backlight module according to an embodiment of the disclosure.
Figure 16:
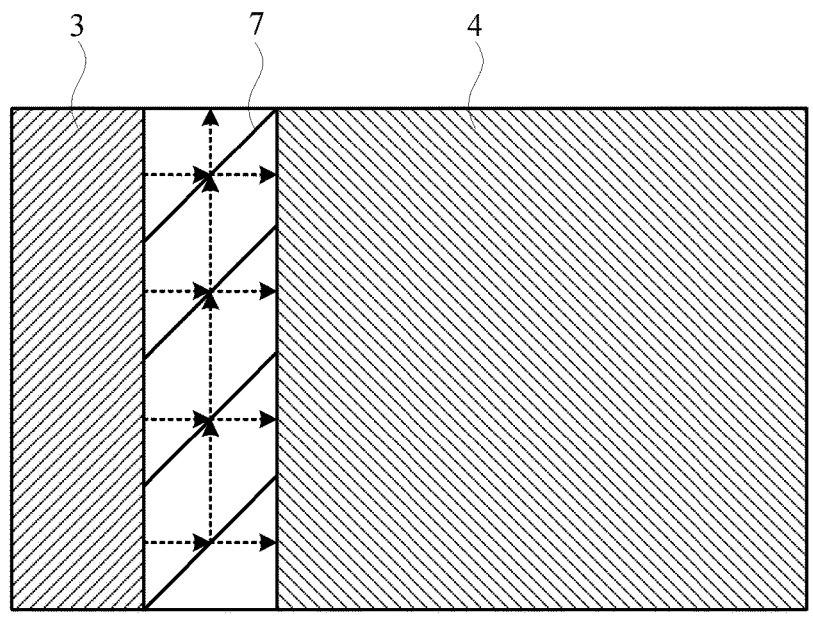
FIG. 16 is a schematic view of a set of half transmitting and half reflective films reflecting light rays according to an embodiment of the disclosure.

FIG. 15 is a schematic sectional view of still another backlight module according to an embodiment of the disclosure. FIG. 16 is a schematic view of a set of half transmitting and half reflective films reflecting light rays according to an embodiment of the disclosure. As shown in FIG. 15, the backlight module further comprises:

a set of half transmitting and half reflective films provided between the first region 11 and the second region 12, and comprising M half transmitting and half reflective films 7, each of which makes a predetermined angle with the second sidewall ABEF of the light guide plate 1, which may be for example 45°.

The m−1th half transmitting and half reflective film has a first surface configured to transmit part of the light rays coming from the first region to the second region and to reflect another part of the light rays to the mth half transmitting and half reflective film, a second surface configured to transmit part of the light rays reflected from the m−2th half transmitting and half reflective film to the mth half transmitting and half reflective film and to reflect another part of the light rays reflected from the m−2th half transmitting and half reflective film to the second region, wherein 1<m≤M, m and M are integers.

In an embodiment, the light rays adjusted by the first grating may travel parallel to the first sidewall, which to some extent results in unevenness of light rays exiting the light guide plate. The set of half transmitting and half reflective films may be provided to adjust partly the light rays travelling parallel to the first sidewall to allow them to travel perpendicular to the first sidewall, and in turn adjust the propagation evenness of the light rays coming from the first region, such that the light rays arriving at the second region are more even, without need of provision of more dense light sources to assure evenness and facilitating deduction of cost.

Figure 17:
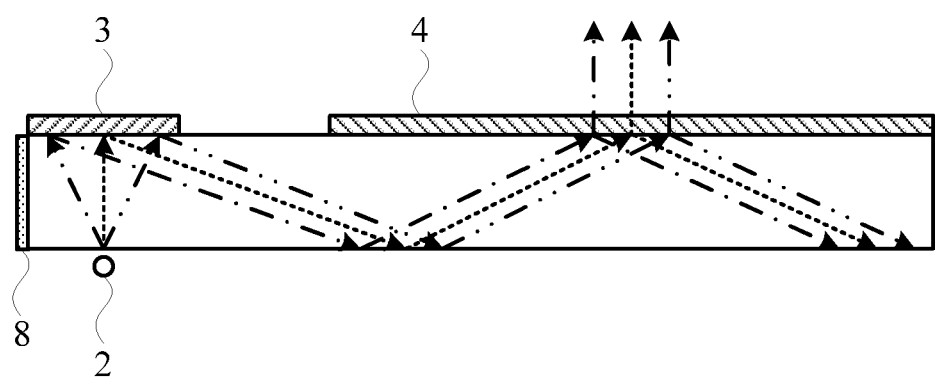
FIG. 17 is a schematic sectional view of still another backlight module according to an embodiment of the disclosure.

FIG. 17 is a schematic sectional view of still another backlight module according to an embodiment of the disclosure. As shown in FIG. 17, the backlight module further comprises:

a reflective layer 8 provided at the second sidewall ABEF of the light guide plate 1 and configured to reflect the light rays from the light source 2 striking the second sidewall ABEF.

In an embodiment, of the light rays emitted from the light source, other than most of them striking the first grating, there is still part of the light rays striking the second sidewall. The reflective layer may be provided to, on one hand, avoid light leakage from the second sidewall of the light guide plate, on the other hand, reflect part of the light rays back to the light guide plate, improving usage of light. Here, the material for the reflective layer may be metal, or other materials having reflecting function.

In an embodiment of the disclosure there is also provided a display device comprising a backlight module according to any of the aforesaid embodiments, and a display panel provided at a side of the second grating away from the light guide plate and having an area equal to that of the second grating.

In an embodiment, the region where the second grating lie may correspond to an effective light emitting region of the display device, while the first grating (and the region provided with half transmitting and half reflective films in the aforesaid embodiments) may correspond to a frame of the display device, thereby ensuring that the light rays collimated by the second grating can all exit the effective light emitting region, while the first grating for diffracting the light rays towards the second region may not correspond to the effective light emitting region, which helps assure the exiting effect of the effective light emitting region.

It should be noted that the display device in the embodiment may be electronic papers, mobile phones, tablet computers, TVs, notebook computers, digital photo frames, navigators, and any products or components having displaying function.

It should be noted that in figures the sizes of the layers and the regions may be exaggerated for clarity of illustration. It would be understood that when an element or layer is referred to be "on" another element or layer, it may be directly on the another element, or there may be an intermediate layer. In addition, it would be understood that when an element or layer is referred to be "under" another element or layer, it may be directly under the another element, or there may be one or more intermediate layers or elements. Furthermore, it would be understood that when an element or layer is referred to be "between" two elements or layers, it may be the single one layer between the two layers or elements, or there may one or more intermediate layers or elements. Throughout the specification, similar references indicate similar elements.

In the disclosure, the terms "first", "second" and the like are only for purpose of description and should not be interpreted to indicate or imply the relative importance. The term "a plurality of" means two or more unless otherwise stated.

Those skilled in the art would readily envisage other embodiments of the disclosure after considering the specification and practicing the disclosure disclosed herein. The disclosure is intended to encompass any variants, usage or adaptive modifications of the disclosure which follow the general principle of the disclosure and comprise common knowledge or customary technical means in the art not disclosed in the disclosure. The specification and the embodiments should be considered to be exemplary only. The true scope and spirit of the disclosure is defined by the appended claims.

What is claimed is:

1. A backlight module comprising: a light guide plate; a light source for emitting light rays towards a first region of the light guide plate;
   a first grating provided at the first region and configured to adjust propagation directions of the light rays, wherein adjusted light rays travel towards a second region of the light guide plate, and the propagation directions make an included angle with a normal to the light guide plate, and the included angle is greater than a critical angle of total reflection of the light guide plate; and
   a second grating provided at the second region and configured to collimate the adjusted light rays, wherein collimated light rays travel in a direction perpendicular to the light guide plate;
   wherein the first grating comprises a plurality of grating sets, each of the grating sets corresponds to one said light source and comprises a plurality of sub-gratings arranged in matrix,
   wherein each of the sub-gratings adjusts the propagation directions of the light rays emitted from corresponding light sources, respectively, such that the adjusted light rays travel towards the second region of the light guide plate, and the propagation directions make an included angle with the normal to the light guide plate which is greater than the critical angle of total reflection of the light guide plate.

2. The backlight module according to claim 1, wherein first sub-gratings of the plurality of first sub-gratings positioned in a same row parallel to a first sidewall of the light guide plate are configured to adjust the propagation directions of the light rays from corresponding light sources, the propagation directions of the adjusted light rays are perpendicular to a second sidewall of the light guide plate, wherein the first sidewall is perpendicular to the second sidewall.

3. The backlight module according to claim 2 further comprising:
   a reflective layer provided at the second sidewall of the light guide plate and configured to reflect the light rays from the light source striking the second sidewall.

4. The backlight module according to claim 2 further comprising: a reflective layer provided at the second sidewall of the light guide plate and configured to reflect the light rays from the light source striking the second sidewall.

5. The backlight module according to claim 1, wherein the second grating comprises N second sub-gratings, a nth second sub-grating of the N second sub-gratings has a distance from the first region greater than that of a n−1th second sub-grating of the N second sub-gratings from the first region, wherein $\eta_1+\eta_2+ \ldots +\eta_N=1$, $\eta_n \times (1-\eta_{n-1})=\eta_{n-1}$, where $1<n\leq N$, n and N are integers, $\eta n$ is diffraction efficiency of the nth second sub-grating.

6. The backlight module according to claim 1, wherein the first grating which is a transmitting grating and the light source are provided at a same side of the light guide plate.

7. The backlight module according to claim 1, wherein the first grating which is a reflective grating and the light source are provided at opposite sides of the light guide plate.

8. The backlight module according to claim 7 further comprising:
   a first absorption layer provided at a side of the first grating away from the light guide plate and configured to absorb light rays exiting from the first grating.

9. The backlight module according to claim 1, wherein the second grating comprises a reflective grating provided at a side of the light guide plate away from the exiting direction.

10. The backlight module according to claim 9, wherein the second grating comprises a transmitting grating provided at a side of the light guide plate in the exiting direction.

11. The backlight module according to claim 9, wherein in the case where the second grating comprises a transmitting grating provided at a side of the light guide plate in the exiting direction, the backlight module further comprises:
a second absorption layer provided at a side of the light guide plate away from the exiting direction and configured to absorb light rays exiting the light guide plate.

12. The backlight module according to claim 1, wherein the second grating comprises a transmitting grating provided at a side of the light guide plate in the exiting direction.

13. The backlight module according to claim 1 further comprising:
a set of half transmitting and half reflective films provided between the first region and the second region and comprising M half transmitting and half reflective films, each of the half transmitting and half reflective films makes a predetermined angle with the second sidewall of the light guide plate,
wherein a m−1th half transmitting and half reflective film has a first surface configured to transmit part of the light rays coming from the first region to the second region and to reflect another part of the light rays to a mth half transmitting and half reflective film, a second surface configured to transmit part of the light rays reflected from a m−2th half transmitting and half reflective film to the mth half transmitting and half reflective film and to reflect another part of the light rays reflected from the m−2th half transmitting and half reflective film to the second region, wherein 1<m≤M, m and M are integers.

14. The backlight module according to claim 1 further comprising:
a reflective layer provided at the second sidewall of the light guide plate and configured to reflect the light rays from the light source striking the second sidewall.

15. A display device comprising a backlight module according to claim 1.

16. The display device according to claim 15, wherein the first grating comprises a plurality of grating sets, each corresponding to one said light source and comprising a plurality of sub-gratings arranged in matrix,
wherein the sub-gratings each adjust the propagation directions of the light rays emitted from corresponding light sources, respectively, such that the adjusted light rays travel towards the second region of the light guide plate, and the propagation directions make an included angle with the normal to the light guide plate which is greater than the critical angle of total reflection of the light guide plate.

17. The display device according to claim 15, wherein first sub-gratings of the plurality of first sub-gratings which are positioned in a same row parallel to a first sidewall of the light guide plate are configured to adjust the propagation directions of the light rays from corresponding light sources such that the propagation directions of the adjusted light rays are perpendicular to a second sidewall of the light guide plate, wherein the first sidewall is perpendicular to the second sidewall.

* * * * *